(12) United States Patent
Womer et al.

(10) Patent No.: US 6,453,713 B1
(45) Date of Patent: Sep. 24, 2002

(54) DEFLECTION DAMPENING APPARATUS FOR A ROLL USED TO PROCESS UNIFORMLY FLAT PRODUCTS

(75) Inventors: Timothy W Womer, Edinburg, PA (US); Richard D. Palmer, Groove City, PA (US)

(73) Assignee: New Castle Industries, Inc., New Castle, PA (US)

( * ) Notice: Subject to any disclaimer, the term of this patent is extended or adjusted under 35 U.S.C. 154(b) by 18 days.

(21) Appl. No.: 09/827,793

(22) Filed: Apr. 6, 2001

(51) Int. Cl.[7] .............................................. B21B 27/02
(52) U.S. Cl. ........................... 72/241.4; 425/363; 492/6
(58) Field of Search ............................... 72/241.4; 492/6, 492/21, 47; 165/89; 425/363, 368; 100/162 B, 176, 155 R

(56) References Cited

U.S. PATENT DOCUMENTS

| | | |
|---|---|---|
| 242,058 A | 5/1881 | Schurmann |
| 3,328,866 A | 7/1967 | Robertson |
| 3,625,280 A | 12/1971 | Peter |
| 3,840,958 A | 10/1974 | Mahn |
| 3,852,860 A | 12/1974 | Tewes |
| 4,158,128 A | 6/1979 | Evdokimov |
| 4,232,834 A * | 11/1980 | Player et al. .................. 492/21 |
| 4,305,191 A * | 12/1981 | Enomoto ........................ 492/6 |
| 4,363,615 A * | 12/1982 | Bolender .................... 425/363 |
| 4,498,527 A * | 2/1985 | Gerarts et al. ................ 492/21 |
| 4,823,450 A | 4/1989 | Ramisch |
| 5,567,448 A | 10/1996 | Frankland |

\* cited by examiner

Primary Examiner—Lowell A. Larson
(74) Attorney, Agent, or Firm—Robert J. Herberger

(57) ABSTRACT

A deflection dampening apparatus for a process roll. The dampening apparatus having C-shaped first and second portions with both portions pivotally interlocking to form a ring. The C-shaped portions have an inner base and a notched outer surface comprising a pair of fined side walls. A plurality of screws are attached through a threaded opening in the inner base with a wedge shaped washer secured therebetween. The screws and wedge shaped washer communicate with the finned side walls, whereby tightening each screw causes the fins to extend outwardly to wedge between a cantilevered inner shell assembly and a cylindrical core of the process roll. When securely wedged therebetween, the dampening apparatus modifies the cantilever effect of the inner shell assembly of the process roll.

11 Claims, 3 Drawing Sheets

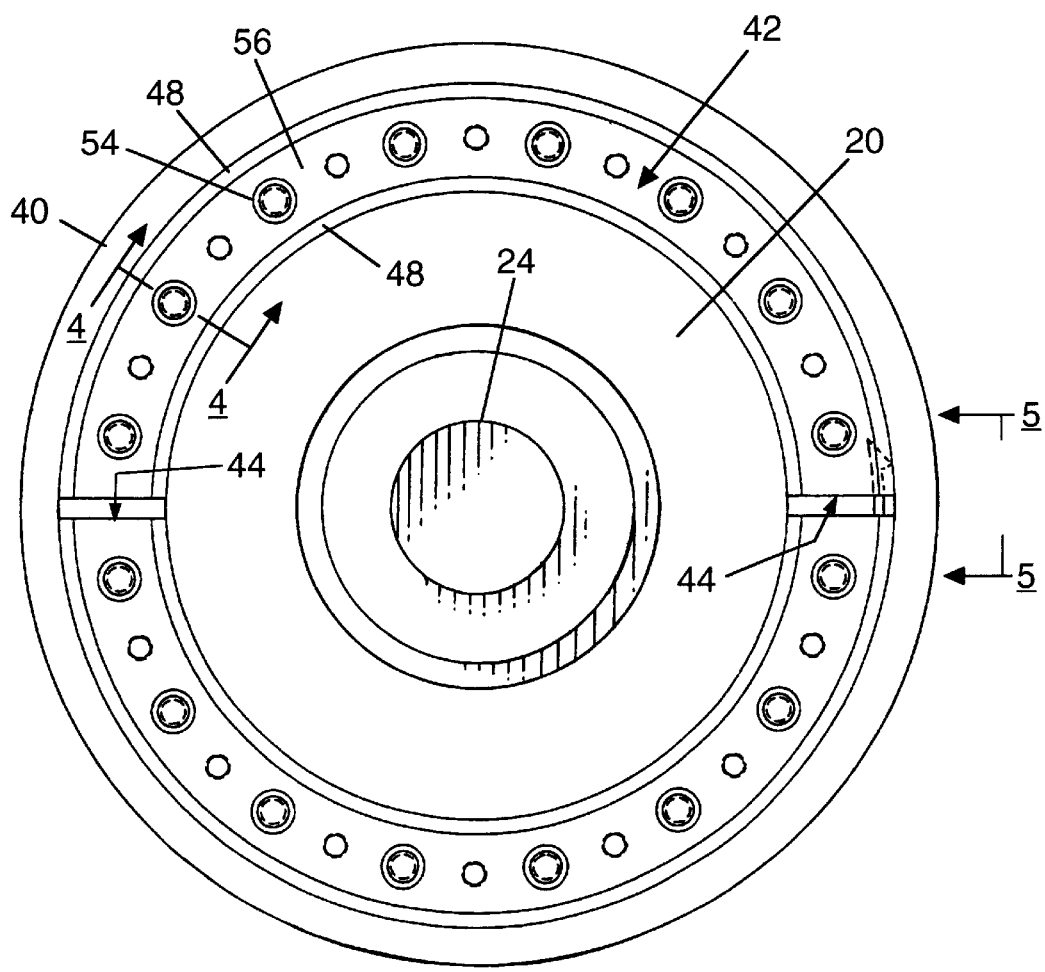
FIG. 3
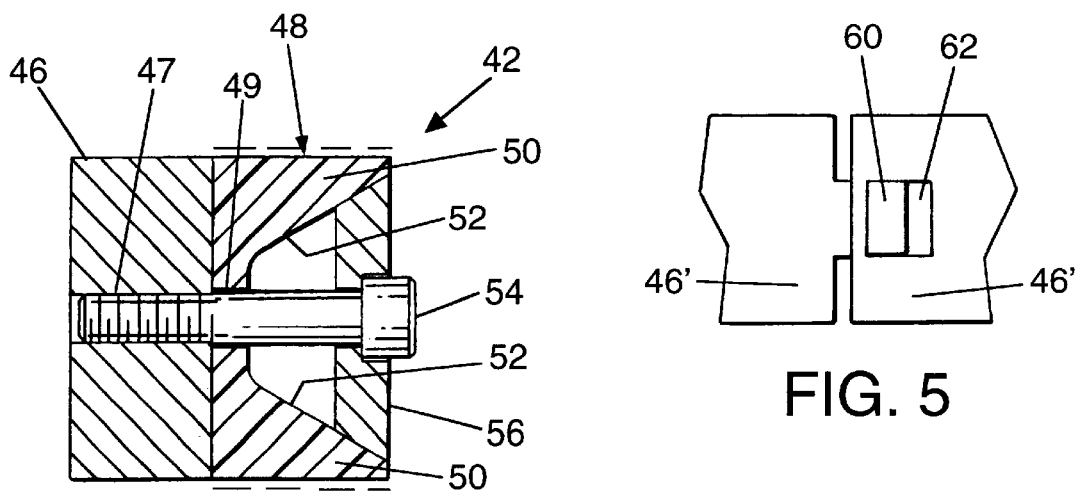
FIG. 4
FIG. 5

DEFLECTION DAMPENING APPARATUS FOR A ROLL USED TO PROCESS UNIFORMLY FLAT PRODUCTS

FIELD OF THE INVENTION

The present invention is an improvement of a process roll used for processing uniformly flat products such as polymer sheet. More specifically, the invention is a deflection dampening apparatus which enables the adjustment of the process roll while mounted.

BACKGROUND OF THE INVENTION

Process rolls of many types and sizes are used for processing a variety of flat materials, such as steel plate, paper, fabric, plastics and rubber. Typically, the material is passed through a series of stacked, temperature controlled rolls that serve to flatten the material into a continuous sheet or web having a desired thickness.

One problem with processing flat materials is the inevitable deflection in the rolls caused by "separating" forces created by the materials' resistance to deformation as its thickness is decreased. Several attempts have been made in the past to reduce roll deflection and thereby increase uniformity in the material being processed, as described in U.S. Pat. No. 242,058 to Schurmann, U.S. Pat. No. 4,158,128 to Evdokimov, U.S. Pat. No. 4,823,450 to Ramisch, and U.S. Pat. No. 5,567,488 to Frankland. A problem with these rolls, however, is the inability to quickly and easily alter the roll parameters mechanically while the roll is secured in the roll stand, in order to maintain or increase uniformity of thickness of the processed material as the roll wears.

More specifically, and as an example, U.S. Pat. No. 5,567,448 provides a flat sheet extrusion system using rolls with cantilever contact members. As the rolls are used repeatedly the modulus of elasticity of the cantilever contact member starts to diminish and the amount of deflection increases. As a result, the thickness of the outer edges becomes greater and the quality of the finished product decreases, thereby raising the cost of manufacturing the finished goods. Ultimately, time consuming adjustment and inevitably replacement of the roll is required.

There is a need for an apparatus, therefore, that will enable easy, quick, and cost effective modification to the roll parameters to more finely adjust the thickness of the finished rolled material as dynamics change with time.

SUMMARY OF THE INVENTION

The present invention is directed to a dampening ring or apparatus that is used to adjust the deflection of the contact surface of a cantilever contact member, such as the inner shell member of the roll described in the U.S. Pat. No. 5,567,448 to Frankland.

In the instant invention, the deflection dampening apparatus comprises a pair of interlocking semicircular or C-shaped portions that form a ring, each portion having an inner base and a notched outer surface. The notched outer surface has a pair of finned side walls. A plurality of screws are attached through openings in the notched outer surface and threaded openings in the inner base. The screws communicate with the finned side walls, whereby tightening the screw causes a continuous "C" shaped wedging washer to force the fins to extend radially outwardly and wedge between the cantilevered contact member and the cylindrical core or axle of the process roll. When securely wedged therebetween, the dampening apparatus decreases the deflection of the cantilevered contact member of the process roll. Since each roll typically has a cantilevered contact member on both sides of the cylindrical core, a second dampening ring is mounted on the opposite side to match the deflection effect thereof.

The two part interlocking dampening ring provides a user with a quick and easy way of adjusting the deflection of the cantilevered contact member without removing the roll from the roll stand, as the pair of C-shaped portions are opened in a clam-like fashion, slipped around the cylindrical core of the roll and positioned into the void formed between the cantilevered contact member and the cylindrical core, interlocked and manually tightened to wedge therebetween. Multiple dampening rings may be used and/or the dampening ring may be manually positioned at a particular location along said void to adjust the pivot point of the cantilevered contact member until the optimum amount of deflection is achieved.

Those skilled in the art can appreciate that the dampening ring apparatus may be economically made from a variety of known materials. Many other objects and features of the present invention will be obvious to those of skill in the art upon contemplation of the disclosure herein in connection with the accompanying drawings.

BRIEF DESCRIPTION OF THE DRAWINGS

It is to be understood that the drawings are designed for the purpose of illustration only and not as a definition of the limits of the instant invention, for which reference should be made to the claims appended hereto. Other features, objects and advantages of this invention will become clear from the following detailed description made with reference to the drawings in which:

FIG. 3. is an end view showing the roll and the interlocking dampering parts as taken from view 3—3 of FIG. 2;

FIG. 4. is an enlarged sectional view of the present invention taken along the line 4—4 of FIG. 3; and FIG. 5 is an enlarged detail showing the interlocking mechanism as taken from 5—5 on FIG. 3.

DETAILED DESCRIPTION OF THE PREFERRED EMBODIMENT

Figure 1:
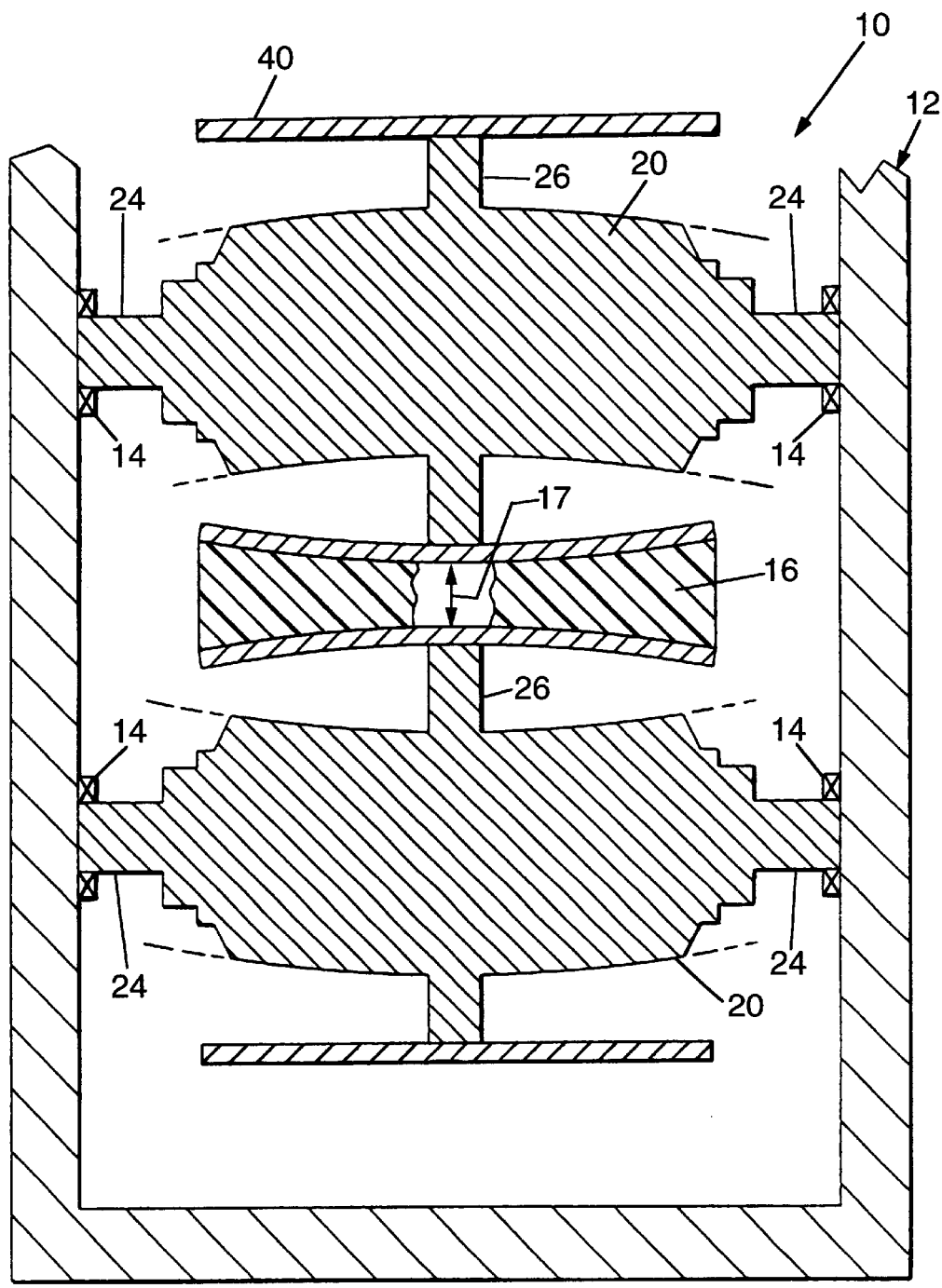
FIG. 1. is a sectional view of two rolls of the prior art arranged to extrude material therebetween.

FIGS. 2 through 5 illustrate the preferred embodiment of the improved portion for rolls having a cantilevered contact member. A suitable roll design is that shown in U.S. Pat. No. 5,567,488 to Frankland, as discussed hereinabove. To the extent that the Frankland Patent discloses a cylindrical roll 10 having an axially extended core 20 that has a center segment 26, two end portions 24, and a shell assembly 40 that extends from the center segment 26, forming two distal end portions so that the end portions of the shell assembly 40 are unsupported and are permitted to deflect in a cantilevered relation to the adjacent end portions 24 of the core 20, it is incorporated herein by reference.

The roll, as described in the Frankland Patent, is typically mounted by bearings 14 to an extrusion apparatus 12, shown in FIG. 1. It will be appreciated that the amount of clearance provided between the cantilevered shell assembly 40 of paired rolls 10 will dictate the ultimate thickness of the extruded sheet. As the material 16 passes between the matched shell assemblies 40, however, it generates separation forces, represented by arrow 17, and the separation forces tend to cause the shell assembly 40 to move away from the roll 10. Theoretically, with the cantilevered assembly such as that described in the Frankland Patent, the amount of the deflection of the roll 10 caused by the separation forces should be matched by the deflection of the shell assembly 40 such that a uniform amount of clearance can be maintained between the shell assemblies 40 during flat sheet extrusion operations. However, since the amount of separating force varies with changing operating parameters (i.e. speed of processing, temperature, thickness of finished product, composition of material being processed, etc.), and with extended use and wear of the roll 10, the amount of deflection of the shell assembly 40 varies and/or ultimately diminishes. As a result, uniform thickness of the finished product may not be consistently achieved.

The present invention is an improvement on the roll which allows for fine adjustment of the cantilever shell assembly 40. More specifically, the present invention is a dampening ring 42 which enables a user to quickly adjust the cantilever effect of the shell member 40 of the roll without having to disassemble the roll from the extrusion apparatus 12.

Figure 2:
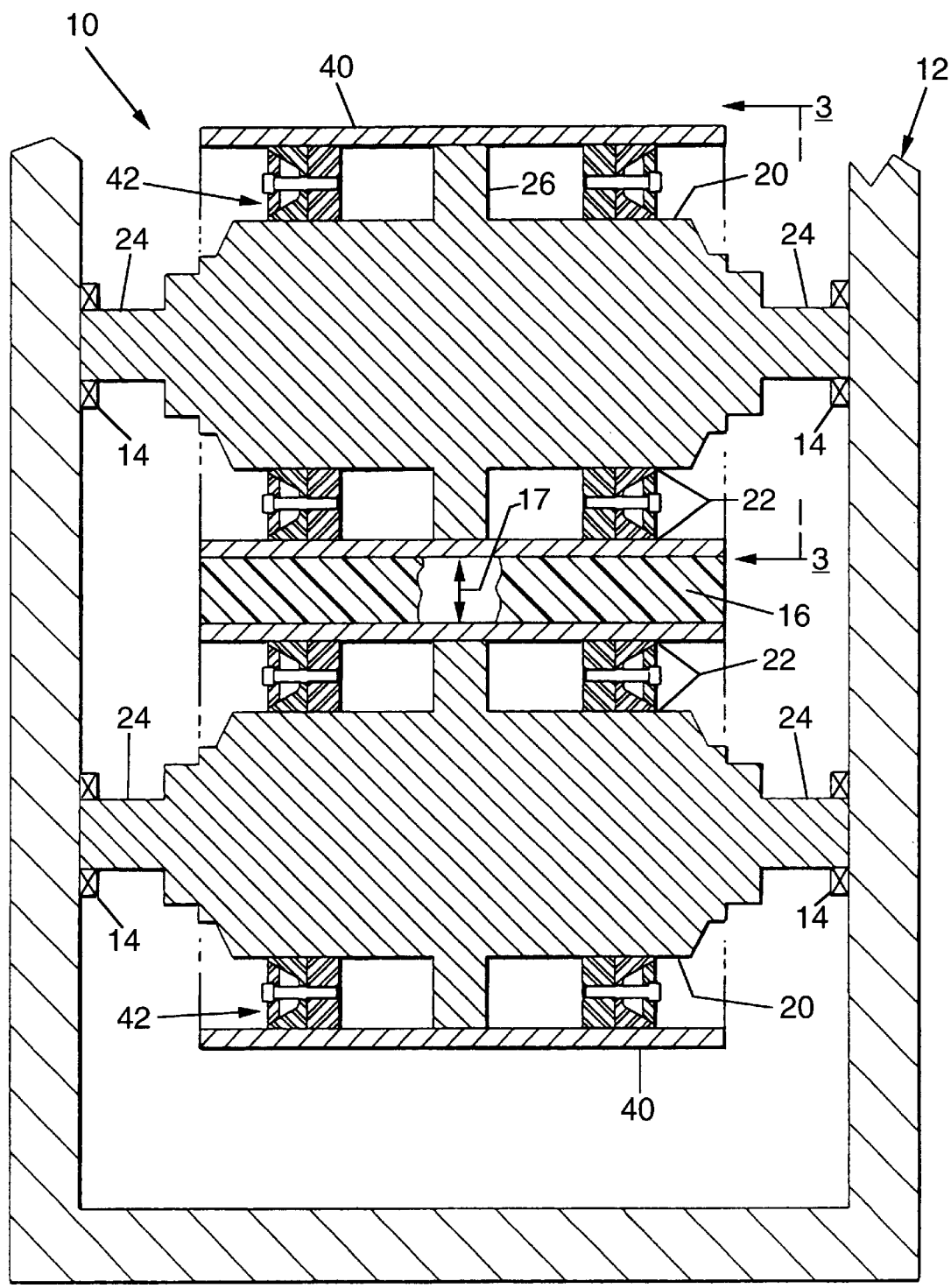
FIG. 2. is a sectional view of the two rolls showing the positioning of the present invention.

Referring to FIGS. 2–4, dampening ring 42 comprises a pair of interlocking C-shaped portions 44. Each C-shaped portion 44 has an inner base 46 and a grooved or notched outer surface 48. The notched outer surface 48 is formed by a pair of fins 50 with sloped inner side walls 52. A plurality of mounting screws 54 are attached to the inner base 46 and are spaced not more than 3 inches apart along the dampening ring 42. Preferably, the mounting screws 54 are spaced an inch apart. Each screw is axially parallel to the longitudinal axis of the core, passing through an enlarged opening 49 in the notched outer surface 48 and threadably engages the inner base 46 through a corresponding registered threaded opening 47. The screws 54 communicate with the sloped inner side walls 52 through a C-shaped wedging washer 56, whereby, tightening each screw 54 forces the corresponding wedging washer 56 toward the ring's inner base 46. In turn the wedging washer 56 slidably communicates along the sloped inner side walls 52 of the fins 50 pushing the inner side walls 52 radially outward, in relationship with the axial length of the screw 54, as depicted in broken-lines in FIG. 4. As a result, the dampening ring 42 is wedged in place between the cantilevered shell assembly 40 and the core 20 of the process roll 10.

For mounting around the core 20 of the process roll 10, the distal ends 46' of the inner base 46 of the paired semicircular or C-shaped portions are either hinged or interlock via a hook 60 and hook opening 62 as shown in FIG. 5. Also, since the cantilevered shell assembly 40 provides for cantilevered deflection at opposite ends of the core 20, a second dampening ring 42 is mounted in like fashion on the opposite side of the core 20 to match the deflection effect of the first dampening ring 42.

Referring to FIGS. 2 and 3, in use, the paired C-shaped portions 44 are positioned around the core 20 and into the void formed with the shell assembly 40 and then slid in place to a pivot point 22 longitudinally outward of the core center segment 26 with notched outer surface 48 facing outward toward the opening of the void. Threaded screws 54 are manually tightened, by access through the void opening, to wedge the dampening ring 42 securely in place as described above. These steps are repeated for the dampening ring 42 at the opposite end of the core 20 of the roll 10 to complete the adjustments thereof. The dampening rings 42 may be attached to the roll 10 before or after the roll is mounted in the roll stand 12.

The dampening ring of the instant invention 42 may be made of a variety of known materials, for instance, metal, plastic or rubber, but due to the large separation and deflection forces created during processing, the preferred embodiment of the invention calls for the base 46, wedge shaped washer 56, and screw 54 being made of metal or other hard material and the outer notched portion 48 being of a hard rubber or plastic material to provide elasticity and friction to assure a secure wedge during actual operation. As an alternative, however, the notched portion 48 can also be made of a metal such as steel so that the fins 50 have a spring-like property.

Having described the preferred embodiment of the invention, it is to be understood that other versions are possible. Therefore, the spirit and scope of the appended claims should not be limited to the description of the preferred version contained herein.

What is claimed is:

1. A deflection dampening apparatus for a process roll, the process roll having an axially extended core with a shell assembly attached to the core in cantilevered relation, the dampening apparatus comprising:

at least two C-shaped portions forming a ring, each said portion having a solid inner base and a notched outer surface, the notched outer surface having a pair of finned side walls, the C-shaped portions interlock by a hinge mechanism;

a plurality of mounting screws and a wedge shaped washer, each screw slideably engaging the wedge shaped washer before threadably attaching to the inner base through an opening in the inner base, an opening in the notched outer surface which is relatively larger and registered with the opening in the inner base; and said screws and wedge shaped washer communicating with the finned side walls of the notched outer surface when said screws are tightened to the inner base by forcing the finned side walls to extend radially outwardly to securely wedge between the axially extended core and cantilevered shell assembly of the roll.

2. The deflection dampening apparatus of claim 1, wherein the finned side walls of the notched outer surface comprises opposing sloped walls that slideably communicate with the wedge shape washer.

3. The deflection dampening apparatus of claim 1, wherein the mounting screws are spaced not more than 3 inches apart along the parameter of the C-shaped portions.

4. The deflection dampening apparatus of claim 1, wherein the notched outer surface is made of rubber material.

5. A deflection dampening apparatus for a process roll, the process roll having an axially extended core with a cantilevered shell assembly attached to the core, the cantilevered shell assembly and core forming a void therebetween, the dampening apparatus comprising:

a pair of semicircular portions forming a ring, each said portion having a solid inner base and a notched outer surface, the notched outer surface having a pair of sloped finned side walls, and the semicircular portions interlock by a hinge mechanism;

a plurality of mounting screws and at least two wedge shaped washers, each screw slideably engaging the corresponding wedge shaped washer before threadably attaching to the inner base through an opening in the inner base, an opening in the notched outer surface which is relatively larger and registered with the opening in the inner base; and said paired screws and wedge shaped washers slideably communicating with the finned side walls of the notched outer surface when said screws are tightened to the inner base by forcing the finned side walls to extend radially outwardly to securely wedge within the void formed between the axially extended core and cantilevered shell assembly of the roll.

6. The deflection dampening apparatus of claim 5, wherein the mounting screws are spaced not more than 2 inches apart along the parameter of the ring.

7. The deflection dampening apparatus of claim 6, wherein the notched outer surface is made of rubber material.

8. The method of dampening the cantilever deflection of a roll mounted in an extrusion apparatus, the roll having an axially extended core with a cantilevered shell assembly attached to the core, the core further comprising a center segment, a first outer segment and a second outer segment with each outer segment extending from the center segment, the cantilevered shell assembly extending from the center segment of the core forming a first longitudinal void with the first outer segment of the core and a second longitudinal void with the second outer segment of the core, the method comprising the following steps:

positioning at least two C-shaped portions to form a first ring around the first outer segment of the core of the roll, the C-shaped portions interlock by a hinge mechanism, each said C-shaped portion having a solid inner base and a notched outer surface, the notched outer surface having a pair of sloped side walls;

adjusting the positioned C-shaped portions within the first longitudinal void between the cantilevered shell assembly and first outer segment of the core;

securing the adjusted C-shaped portions within said first longitudinal void by tightening a plurality of screws spaced around a parameter of said C-shaped portions so that each screw cause a wedge shaped washer to slideably engage the pair of sloped side walls of the notched outer surface to force said sloped side walls to extend radially outward to securely wedge within the first longitudinal void; and repeating the positioning, adjusting and securing steps for a second ring to securely wedge within the second longitudinal void formed between the second outer segment of the core and the cantilevered shell assembly.

9. The deflection dampening method of claim 8, wherein the mounting screws are spaced not more than 3 inches apart along the parameter of the C-shaped portions.

10. The deflection dampening method of claim 8, wherein the notched outer surface is made of a resilient material.

11. The deflection dampening method of claim 8, wherein the hinge mechanism of the C-shaped portions comprising a hook and hook opening.

* * * * *